United States Patent
Munugoti et al.

(10) Patent No.: US 11,372,574 B2
(45) Date of Patent: Jun. 28, 2022

(54) DISTRIBUTION OF ASSET MODEL RUNTIME DATA

(71) Applicant: Schneider Electric Systems USA, Inc., Foxboro, MA (US)

(72) Inventors: Mallikarjuna Munugoti, Hyderabad (IN); James P. McIntyre, Aliso Viejo, CA (US); Sameer Kondejkar, Pune (IN); Padmaja Bodanapu, Secunderabad (IN)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

(21) Appl. No.: 16/953,190

(22) Filed: Nov. 19, 2020

(65) Prior Publication Data
US 2022/0155961 A1    May 19, 2022

(51) Int. Cl.
*G06F 3/06* (2006.01)
*G06F 8/65* (2018.01)

(52) U.S. Cl.
CPC .............. *G06F 3/065* (2013.01); *G06F 3/061* (2013.01); *G06F 3/0604* (2013.01); *G06F 3/0679* (2013.01); *G06F 8/65* (2013.01); *G06F 3/0656* (2013.01)

(58) Field of Classification Search
CPC ........ G06F 3/065; G06F 3/0604; G06F 3/061; G06F 3/0679; G06F 3/0656
USPC ........................................................ 711/118
See application file for complete search history.

(56) References Cited

U.S. PATENT DOCUMENTS

| | | | |
|---|---|---|---|
| 11,016,688 B1* | 5/2021 | Gray | G06F 3/067 |
| 2016/0277497 A1* | 9/2016 | Bannister | G06F 3/0605 |
| 2017/0102678 A1 | 4/2017 | Nixon et al. | |
| 2017/0235485 A1* | 8/2017 | Davis | G06F 3/0674 |
| | | | 711/113 |
| 2019/0339688 A1 | 11/2019 | Celia et al. | |
| 2020/0034050 A1* | 1/2020 | Brasfield | G06F 3/0619 |

FOREIGN PATENT DOCUMENTS

| | | |
|---|---|---|
| WO | PCT/US2020/24501 A1 | 10/2020 |
| WO | PCT/US2020/24502 A1 | 10/2020 |
| WO | PCT/US2020/24506 A1 | 10/2020 |

OTHER PUBLICATIONS

Extended European Search Report for European Patent Application No. EP21204502.5, dated Apr. 4, 2022.

* cited by examiner

*Primary Examiner* — Than Nguyen

(57) ABSTRACT

A method is provided for managing availability of runtime asset data used by client applications hosted on workstations of an industrial system, the method including distributing runtime asset data about assets of the industrial system received at the plurality of workstations among runtime asset data caches associated with the client applications. At least a portion of locally stored runtime asset data stored on a local runtime asset data cache is replicated and stored remotely on the runtime asset data cache associated with another client application. The locally stored runtime asset data is periodically evaluated to determine if it is up-to-date, and in response to determining it is not up-to-date, the locally stored runtime asset data is updated by requesting and retrieving a replicated and updated version of the locally stored runtime asset data from the runtime asset data cache remotely storing the replicated version.

20 Claims, 5 Drawing Sheets

DISTRIBUTION OF ASSET MODEL RUNTIME DATA

TECHNICAL FIELD

The present disclosure relates to distribution of asset model runtime data to operator workstations executing client applications, and more particularly, to support of sub-second failover of the client applications using the distribution of the asset model runtime data.

BACKGROUND

Operations workstations of an industrial plant system, such as workstations or operation stations, are configured to host client applications to show run time data of the plant system. These operations workstations can use a serverless or server based architecture to support failover. In a serverless architecture, the client application fetches runtime data from a controller without a middle layer. Whenever there is data request from one of the client applications, the client application subscribes to the controller data on demand. In order to have highly available client applications, the same client application is executed on multiple operations workstations. When a primary operations workstation fails, an operator of the operations workstation switches to a secondary operations workstation. Since the runtime data is fetched based on an OnDemand subscription, the client application display callup time is high, namely about eight seconds for a display having 1000 input/output (I/O) references.

In a server-based architecture, a middle layer can be used to fetch the runtime data from the controller and related cache. In an active-active configuration (in which multiple operations workstations actively run the same kind of service simultaneously), a client application can submit a data request to obtain the runtime data from the cache, which reduces the client application display callup time to under seconds sec for a display having 1000 I/O references. However, failover time is increased for an active-passive configuration (in which a primary operations workstation is active and a secondary operations server serves as a backup for when the primary operations workstation is unavailable). Furthermore, in the active-active configuration additional hardware and software licenses are needed that increase cost of the solution.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a computer-implemented method for managing availability of runtime asset data used by client applications hosted on each of a plurality of workstations of an industrial system. The method includes determining a distribution of the runtime asset data received at the plurality of workstations from a plurality of data servers. The runtime asset data includes data about assets of the industrial system. In addition, the runtime asset data is determined to be distributed among runtime asset data caches associated with the respective plurality of client applications. The method further includes distributing the runtime asset data for storage in the runtime asset data caches based on the determined distribution, wherein at least a portion of the runtime asset data stored locally on the runtime asset data cache associated with the respective plurality of client applications is replicated and stored remotely on the runtime asset data cache associated with at least one other client application of the plurality of client applications. The runtime asset data stored locally on the runtime asset data cache associated with the respective plurality of client applications is periodically evaluated to determine if the locally stored runtime asset data is up-to-date, and in response to determining the locally stored runtime asset data is not up-to-date, the locally stored runtime asset data is updated by requesting and retrieving a replicated and updated version of the locally stored runtime asset data from the runtime asset data cache remotely storing the replicated version.

In one or more embodiments, the method can further include periodically evaluating the runtime asset data stored locally on the runtime asset data cache associated with the client application hosted by the workstation to determine if the locally stored runtime asset data is up-to-date, and in response to determining the locally stored runtime asset data is not up-to-date, requesting and retrieving the replicated and updated version of the locally stored runtime asset data from the runtime asset data cache remotely storing the replicated version. The method can further include updating the the locally stored runtime asset data with the requested data.

In one or more embodiments, the distribution can be based on one or more configurable parameters.

In one or more embodiments, determining if the locally stored runtime asset data is up-to-date can include evaluating at least one of value, quality, and timestamp attributes of the stored runtime asset data to determine if the stored runtime asset data is up-to-date.

In one or more embodiments, the locally stored runtime asset data can be used by the client application associated with the runtime asset data cache to provide an information view to a user.

In one or more embodiments, the runtime asset data on the runtime asset data cache can provide information about assets of the system, and the information about each asset can include at least one of information about all control loops associated with the asset, relationships between the asset and different assets of the system, and signals associated with the asset.

In one or more embodiments, the method can further include, when runtime asset data stored locally on one of the runtime asset data caches is replicated, identifying a runtime asset data cache that stores remotely the replicated runtime asset data to the client application associated with the runtime asset data cache and/or the client application's hosting workstation.

In accordance with another aspect of the disclosure, disclosed is a cache management system for managing availability of runtime asset data used by client applications hosted on each of a plurality of workstations of an industrial system. The cache management includes a memory configured to store a plurality of programmable instructions and at least one processing device in communication with the memory. The at least one processing device, upon execution of the plurality of programmable instructions is configured to determine a distribution of the runtime asset data received at the plurality of workstations from a plurality of data servers, wherein the runtime asset data includes data about assets of the industrial system and wherein the runtime asset data is determined to be distributed among runtime asset data caches associated with the respective plurality of client applications. The at least one processing device, upon execution of the plurality of programmable instructions is further configured to distribute the runtime asset data for storage in the runtime asset data caches based on the determined distribution, wherein at least a portion of the runtime asset data stored locally on the runtime asset data cache associated with the respective plurality of client applications is replicated and stored remotely on the runtime asset data cache associated with at least one other client application of the plurality of client applications. The runtime asset data stored locally on the runtime asset data cache associated with the respective plurality of client applications is periodically evaluated to determine if the locally stored runtime asset data is up-to-date, and in response to determining the locally stored runtime asset data is not up-to-date, the locally stored runtime asset data is updated by requesting and retrieving a replicated and updated version of the locally stored runtime asset data from the runtime asset data cache remotely storing the replicated version.

In one or more embodiments, the data servers can include hardware devices and/or software data sources that transmit the runtime asset data to respective data service providers implemented on the respective plurality of workstations.

In one or more embodiments, cache management system can further include a data service instance associated with each workstation, wherein the data service instance associated with each workstation can include a data service memory configured to store a plurality of data service programmable instructions and at least one data service processing device in communication with the data service memory, wherein the at least one data service processing device, upon execution of the plurality of data service programmable instructions can be configured to periodically evaluate the runtime asset data stored locally on the runtime asset data cache associated with the client application hosted by the workstation to determine if the locally stored runtime asset data is up-to-date, in response to determining the locally stored runtime asset data is not up-to-date, request and retrieve a replicated and updated version of the locally stored runtime asset data from the runtime asset data cache remotely storing the replicated version, and update the locally stored runtime asset data with the requested data.

In one or more embodiments, at least one of the workstations can be a cloud-hosted control interface workstation providing an interface between a user and a machine or operations system for controlling and/or managing the machine or operations system, and at least one of the plurality of work stations can be at least one of an on-site control interface workstation, an embedded control interface workstation, a virtualized control interface workstation, a containerized control interface workstation, or a control interface workstation hosted directly on hardware.

In one or more embodiments, the distribution can be based on one or more configurable parameters.

In one or more embodiments, determining if the locally stored runtime asset data is up-to-date can include evaluating at least one of value, quality, and timestamp attributes of the stored runtime asset data to determine if the stored runtime asset data is up-to-date.

In one or more embodiments, the locally stored runtime asset data can be used by the client application associated with the runtime asset data cache to provide an information view to a user.

In one or more embodiments, the runtime asset data on the runtime asset data cache can provide information about assets of the system, and the information about each asset can include at least one of information about all control loops associated with the asset, relationships between the assets and different assets of the system, and signals associated with the asset.

In one or more embodiments, the at least one data service processing device, upon execution of the plurality of data service programmable instructions, can be further configured to, when runtime asset data stored locally on one of the runtime asset data caches is replicated, identify a runtime asset data cache that stores remotely the replicated runtime asset data to the client application associated with the runtime asset data cache and/or the client application's hosting workstation.

In accordance with a further aspect of the disclosure, a method is provided for managing availability of runtime asset data used by client applications hosted on each of a plurality of workstations of an industrial system. The method includes, at a workstation of the plurality of workstations, accessing a portion of the runtime asset data stored locally by a runtime asset data cache associated with a client application of the plurality of applications that is hosted by the workstation, wherein the runtime asset data includes data about assets of the industrial system. The runtime asset data is distributed to be stored among runtime asset data caches associated with the respective plurality of client applications. In addition, at least a portion of the runtime asset data stored locally on the runtime asset data cache associated with the respective plurality of client applications is replicated and stored remotely on the runtime asset data cache associated with at least one other client application of the plurality of client applications. The method further includes periodically evaluating the runtime asset data stored locally on the runtime asset data cache associated with the respective plurality of client applications to determine it the locally stored runtime asset data is up-to-date and, in response to determining the locally stored runtime asset data is not up-to-date, updating the locally stored runtime asset data by requesting and retrieving a replicated and updated version of the locally stored runtime asset data from the runtime asset data cache remotely storing the replicated version.

In one or more embodiments, the method can further include receiving the portion of the runtime asset data at communication interfaces of the workstation and storing the portion of the runtime asset data in the runtime asset data cache associated with the client application hosted by the workstation.

In one or more embodiments, the communication interfaces of the workstation can be extensible communication interfaces.

In one or more embodiments, the method can further include, at the workstation, translating the portion of the runtime asset data stored locally by the runtime asset data cache into a workable protocol that can be processed by the workstation and/or used by the client application hosted by the workstation.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure is directed to high availability of runtime data, such as for display in dynamic asset model information views displayed by client applications of operation workstations of a plant using a distributed runtime data cache. At least a portion of the runtime data stored locally on the runtime data cache associated with the respective client applications is replicated and stored remotely on a runtime data cache associated with at least one other client application of the client applications.

Figure 1:
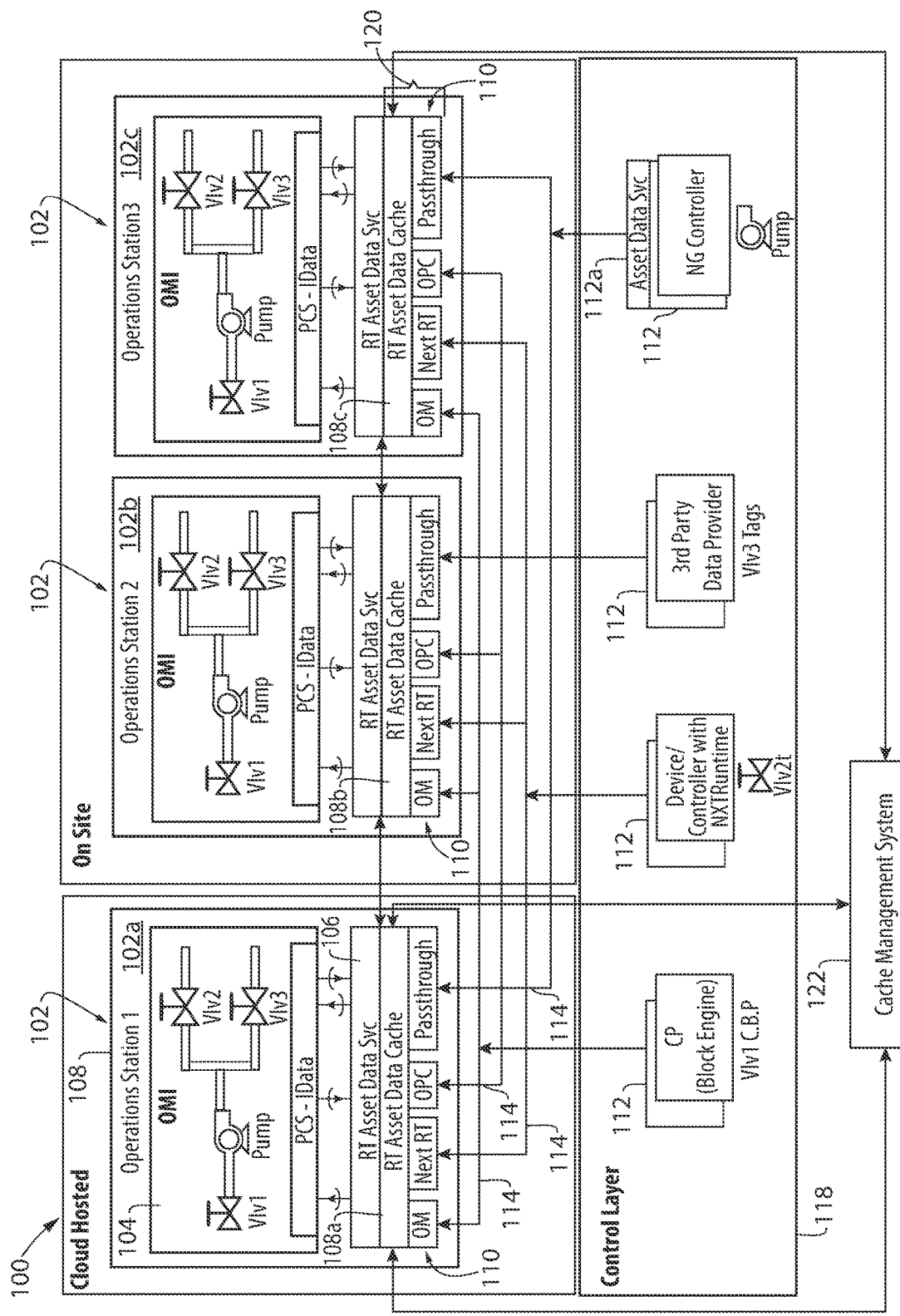
FIG. 1 is a block diagram illustrating an industrial plant system having multiple workstations, in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a plant system in accordance with the disclosure is shown in FIG. 1 and is designated generally by reference character 100. Other embodiments of the plant system 100 in accordance with the disclosure, or aspects thereof, are provided in FIGS. 2-5, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a memory storage device or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Plant system 100 includes multiple plant operations workstations 102 that cooperate with a plant asset model 120 stored in a runtime data cache 108 distributed across plant operations workstations 102. A runtime data service 106 and one or more data service providers 110 are instantiated on each plant operations workstation 102. Each plant operations workstation 102 further hosts one or more client applications 104 that provide dynamic asset model information views for displaying runtime data of the plant asset model 120. The runtime data about the plant assets received from data servers 112 is split into multiple partitions and distributed to the respective plant operations workstations 102. Runtime data service instances 106 communicate with a control layer 118 having one or more data servers 112 that represent plant assets. In this way, a runtime asset model schema is provided that abstractly models runtime data service 106 and provides a generic asset model namespace for communication provided to the client applications 104. The runtime asset model schema is extensible to a variety of data servers 112 of control layer 118 and a variety of communication protocols, including being extensible to data servers 112 and communication protocols that are not known at the time of configuring the plant asset model, such as future controllers and/or protocols.

Plant system 100 further includes a cache management system 122 that manages distribution of runtime data to the runtime data caches 108 associated with respective individual operations workstations 102 as a function of one or more parameters. The runtime data caches 108 and the cache management system 122 provide a distributed cache infrastructure that maintains a redundant copy of each partition of the runtime data and updates the runtime data in real time from the data servers 112. The instance of the data service 106 executed by each plant operations workstation 102 can access the runtime data cache 108 for an entire namespace of the plant asset model 120.

The client applications can include, for example and without limitation, an asset analytics module, an operations management interface (OMI), a human machine interface (HMI), a condition or health monitoring module, a root cause analysis module, or a historian, each having the ability to provide an information view. The runtime data provided by the plant process and automation assets via runtime data servers 112 and displayed in the information views can be browsed to understand relationships between different assets and to discover signals associated with each asset in a particular information view. Examples of models represented in information views include International Society of Automation (ISA) 88 or ISA 106 plant model, plant network model (switches, routers, VLANs, connected devices, etc.), and power distribution model.

The runtime data includes data about assets of the plant, providing information about relationships between the assets and about signals associated with each asset of interest to the corresponding operations workstation of the plant.

Cache management system 122 and each workstation 102 (including the associated data services 106) is a stationary or mobile computer device, such as a server, desktop computer, laptop computer, tablet, or smartphone. One or more of workstations 102, such as workstations 102b, can be configured as a cloud-hosted control interface workstation providing an interface between a user and a machine or operations system for controlling and/or managing the machine or operations system. One or more of the workstations 102, such as workstation 102a, can be configured as an on-site control interface workstation, an embedded control interface workstation, a virtualized control interface workstation, a containerized control interface workstation, or a control interface workstation hosted directly on hardware.

Each instance of runtime data service 106 is a software program executed by the corresponding workstation 102. Runtime data cache 108 includes a plurality of physical data caches integrated with or accessible to the corresponding workstation 102.

Each instance of runtime data service 106 receives runtime data from one or more of the data servers 112 via data service providers 110 and translates protocols associated with a schema of the plant asset model 120 into a workable protocol, such as one or more proprietary and/or standard protocols (e.g., InTouch OMIT™, OPC UA™) that the instance of runtime data service 106 can process and understand and/or that can be used by the client application 108 hosted by the corresponding workstation 102. A workstation in its role as a master node receives data via its data service providers 110 and stores the data in its runtime data caches 108. The cache management system 122 replicates runtime data received and stored in the runtime data cache of a workstation operating as a master node and distributes the replicated data to runtime data caches 108 of workstations that are designated as slave nodes.

Data service providers 110 include communication interfaces, including hardware and/or software interfaces to enable receipt of runtime data by the corresponding workstation's instance of runtime data service 106 from data servers 112.

The data servers 112 include hardware devices and can further include associated software data sources 112A. The hardware devices control assets of plant system 100. Software data source 112A can communicate runtime data related to the hardware devices to the instances of asset data service 106. The runtime data is received from data servers 112 at each asset data service 106 instance via the data service providers 110. Each data service provider 110 receives runtime data from data servers 112 via communication paths 114 and provides a communication interface between the data servers 112 and the asset data service 106 instance. The communication interface is extensible to allow for new capabilities and/or functionality, enabling the extensibility to the variety of data servers 112 and communication protocols used by the data servers 112.

High availability of the runtime data is achieved by determining a distribution of the runtime data among the runtime data cache 108 associated with the respective client applications 104 based on one or more parameters. The runtime data is then distributed and stored in the respective runtime data caches 108 based on the determined distribution. Parameters used for managing distribution of the runtime data can be based on administrator entered data or can be determined automatically based on a state of the plant system 100, such as for load balancing. At least a portion of the runtime data stored locally on the runtime data cache 108 associated with the respective client applications 104 is replicated and stored remotely on the runtime data cache 108 associated with at least one other of the client applications 104.

The runtime data stored locally on the runtime data cache associated with the respective plurality of client applications is periodically evaluated to determine if the locally stored runtime asset data is up-to-date.

In response to determining the locally stored runtime data is not up-to-date, updated runtime data is requested and retrieved from the runtime data cache 108 associated with at least one of the other client applications that has an associated runtime data cache remotely and stored as an updated version of the locally stored runtime data.

A determination whether the locally stored runtime data is up-to-date includes evaluating at least one of value, quality, and timestamp (VQT) attributes of the locally stored runtime data to determine if the locally stored runtime data is up-to-date. The value attribute of an item of the locally stored runtime data is the latest value that the asset data service 106 instance stored for that particular item. The value in the runtime data cache 108 is updated whenever the asset data service 106 instance reads from any of the data servers 112. The quality attribute of the item represents an indication of how well the value stored in the runtime data cache 108 matches a device value, wherein a device value is a value provided from a device of the data servers 112. The timestamp attribute of the item represents a most recent time that the asset data service 106 instance assessed that the data server 112 set the value and quality attributes of the locally stored item.

TABLE I shows the VTQ attributes for a locally stored item. In this example, the stored item relates to a tank level

| S.No | Value | Quality | Timestamp | Comments |
|---|---|---|---|---|
| 1 | 45.0 | Good | 2020-09-24 18:50:41.061 | Initial Value |
| 2 | 45.0 | Good | 2020-09-24 18:51:42.156 | No change in value and quality, but cache will be updated with new data access time stamp from the device |
| 3 | 52.0 | Good | 2020-09-24 18:50:43.055 | Value changed |
| 4 | 54.4 | Bad | 2020-09-24 18:50:45.323 | Value is changed but quality is bad |
| 5 | 60.5 | Good | 2020-09-24 18:50:47.135 | Value is changed and quality is good |

TABLE I-continued shows the VTQ attributes for a locally stored item. In this example, the stored item relates to a tank level

| S.No | Value | Quality | Timestamp | Comments |
|------|-------|-----------|-------------------------|--------------------------------------------|
| 6 | 65.6 | Uncertain | 2020-09-24 18:50:49.567 | Value is changed and quality is unceratin |
| 7 | 75.6 | Good | 2020-09-24 18:50:51.541 | Value is changed and quality is good |
| 8 | 80.2 | Good | 2020-09-24 18:50:53.945 | Value is changed and quality is good |

When runtime data stored locally on one of the runtime data caches 108 is replicated, the cache management system 122 identifies a runtime data cache 108 that stores remotely the replicated runtime data to the client application 104 associated with the runtime data cache 108 (and/or the client application's 104 hosting workstation).

Figure 2:
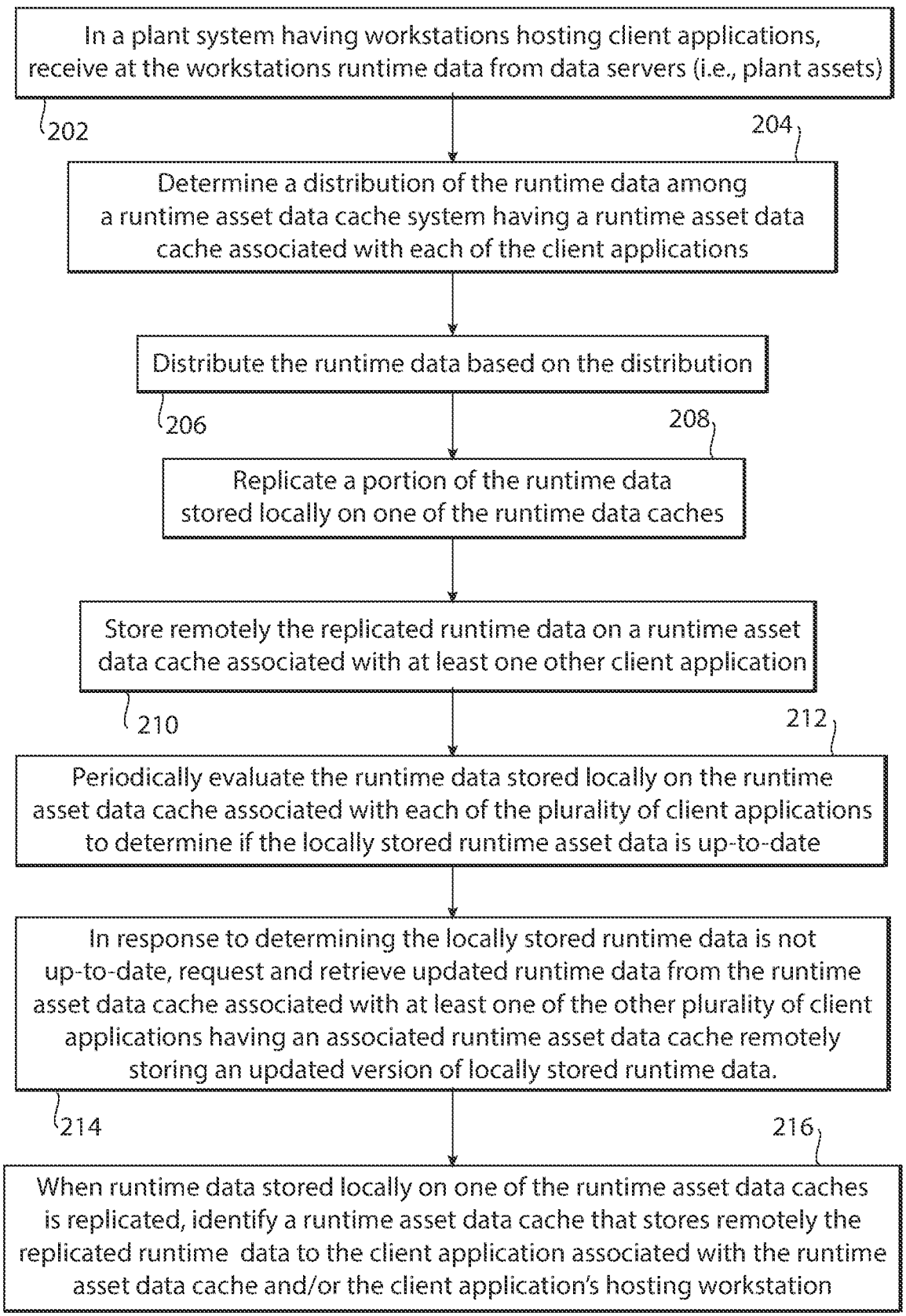
FIG. 2 is a flowchart of an example method of managing availability of runtime asset data used by client applications hosed by the workstations shown in FIG. 1, in accordance with embodiments of the disclosure.
Figure 3:
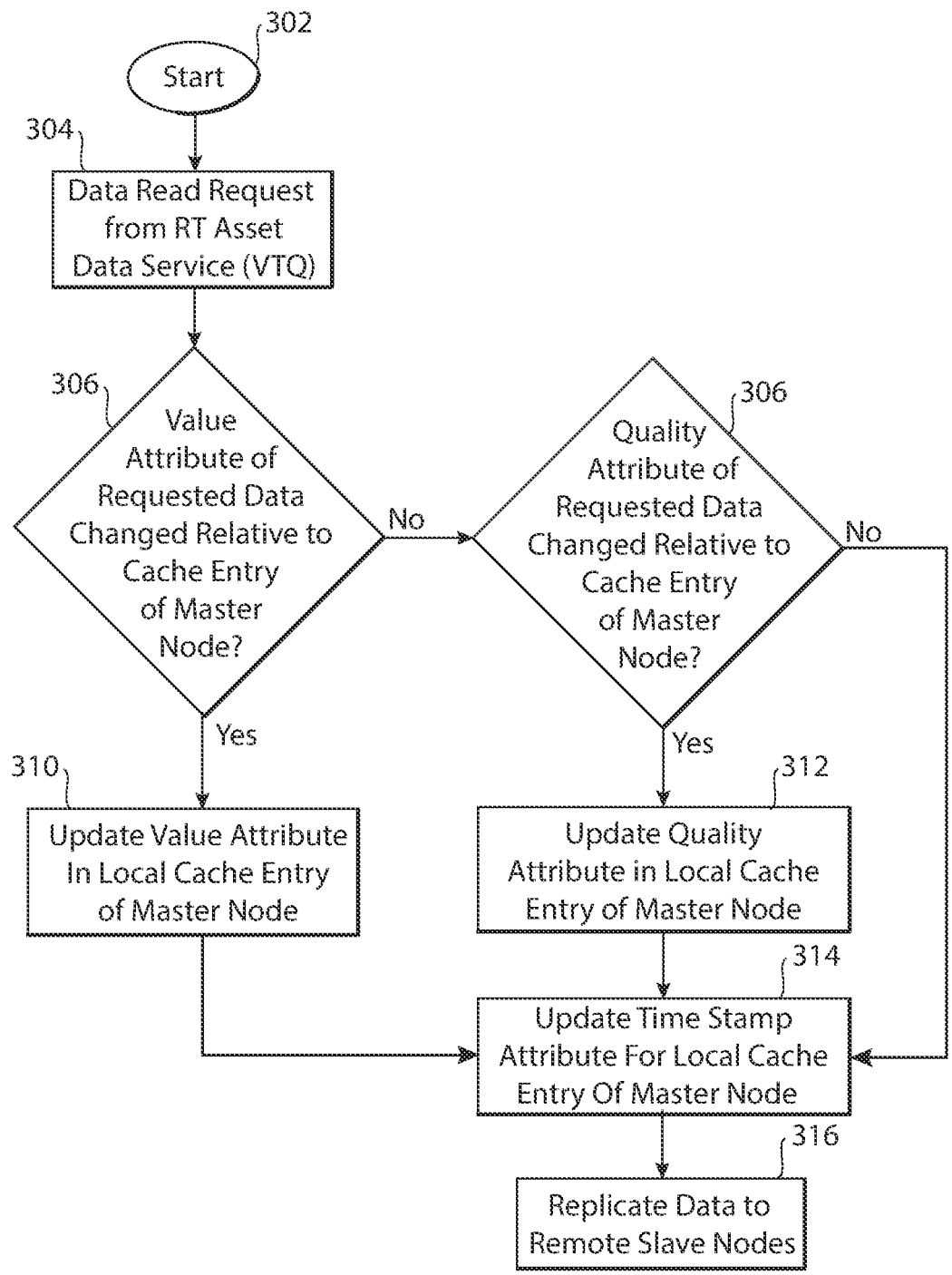
FIG. 3 is a flowchart of an example method of determining a distribution of runtime data among runtime asset data caches associated with respective client applications hosted by the workstations shown in FIG. 1, in accordance with embodiments of the disclosure.
Figure 4:
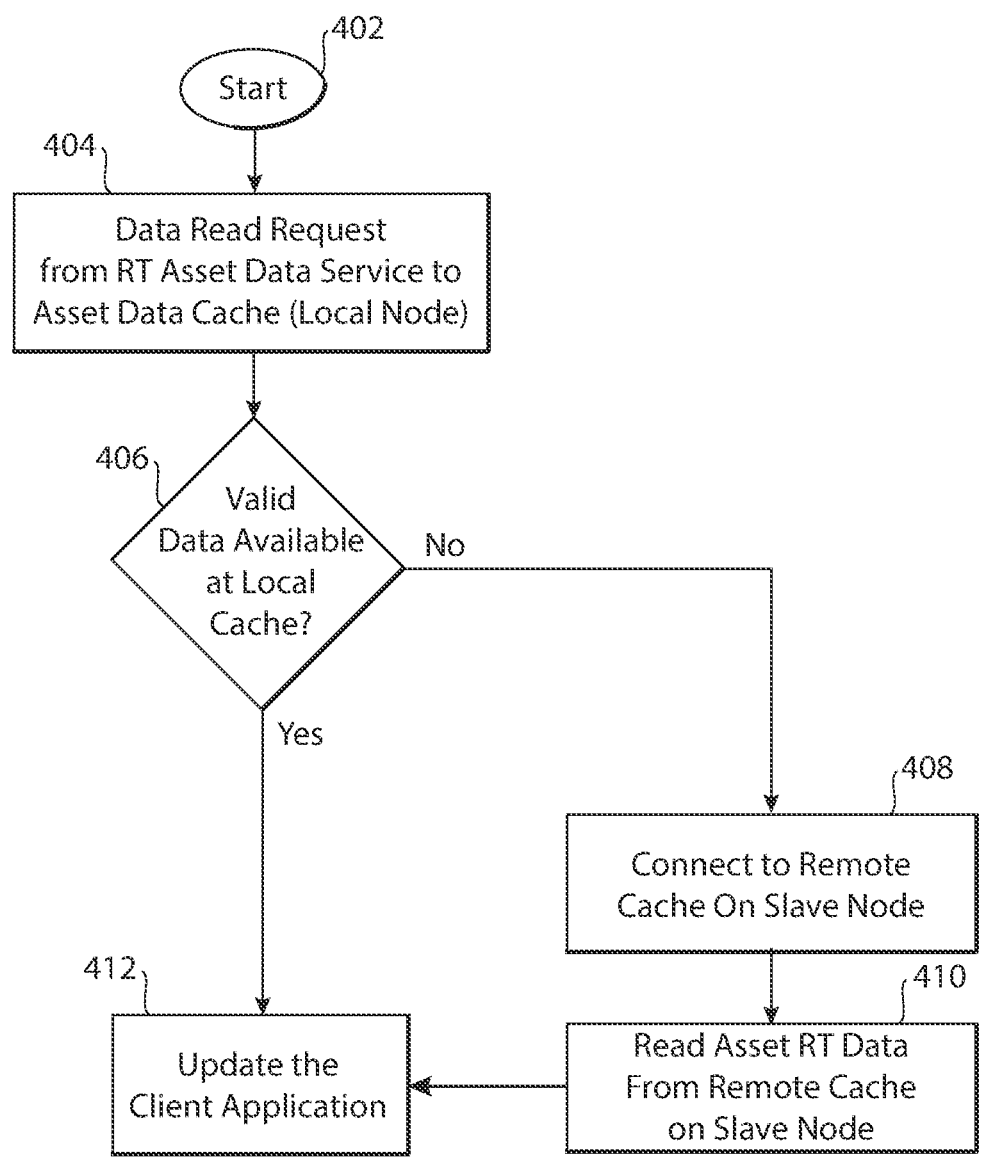
FIG. 4 is a flowchart of an example method of a flow diagram 400 is shown of a method of updating a data entry stored in the local runtime asset data cache of a master node with a data entry remotely stored on a slave node of the plant system shown in FIG. 1, in accordance with embodiments of the disclosure.

FIGS. 2-4 shows non-limiting flowcharts illustrating methods of the disclosure in accordance with certain illustrated embodiments. Before turning to the description of FIGS. 2-4, it is noted that the flowcharts 200, 300, and 400 in FIGS. 2-4 each show examples in which operational blocks are carried out in a particular order, as indicated by the lines connecting the blocks, but the various blocks shown in this flowchart can be performed in a different order, or in a different combination or sub-combination. It should be appreciated that in some embodiments some of the blocks described below may be combined into a single block. In some embodiments, one or more additional blocks may be included. In some embodiments, one or more of the blocks can be omitted.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

With reference to FIG. 2, a flow diagram 200 of managing availability of runtime asset data used by client applications (such as client applications 104 shown in FIG. 1) hosted on each of a plurality of workstations (such as workstations 102 shown in FIG. 1) of a plant system (such as plant system 100 of FIG. 1) is shown. At block 202, in the workstations receive runtime data from data servers (i.e., plant assets). At block 204, a distribution is determined of the runtime data among a runtime data cache system having a runtime data cache associated with the respective client applications. At block 206, the runtime data is distributed based on the distribution determined. At block 208, a portion of the runtime data that is stored locally on one of the runtime data caches 210 is replicated. At block 208, the replicated runtime data is stored remotely on a runtime asset data cache associated with at least one other client application.

At block 212, the runtime data stored locally on the runtime asset data cache associated with the respective plurality of client applications is periodically evaluated to determine if the locally stored runtime asset data is up-to-date. At block 214, in response to determining the locally stored runtime data is not up-to-date, request and retrieve updated runtime data from the runtime asset data cache associated with at least one of the other plurality of client applications having an associated runtime asset data cache remotely storing an updated version of locally stored runtime data. At block 216, when runtime data stored locally on one of the runtime asset data caches is replicated, a runtime asset data cache is identified that stores remotely the replicated runtime data to the client application associated with the runtime asset data cache and/or the client application's hosting workstation.

With reference to FIG. 3, a flow diagram 300 is shown of a method of determining a distribution of runtime data among runtime asset data caches (such as runtime data caches 108 shown in FIG. 1) associated with respective client applications hosted by workstations of a plant system (such as client applications 104 hosted by workstations 102 of plant system 100 shown in FIG. 1). The method starts at block 302. At block 304, a data read request is processed from a runtime asset data service instance (such as data services 106 instances shown in FIG. 1) of a workstation. This workstation can be designated as a master node that has one or more designated slave nodes included in the plant system. The workstation has a local runtime asset data cache. This data read request can be a request to read runtime data from an asset, such as to read runtime data from a data server 112 via data service provider 110 shown in FIG. 1. The data requested can be evaluated for VTQ by comparing it to a corresponding data entry stored in the local runtime asset data cache. At block 306, a determination is made, based on a result of the evaluation, whether the value attribute of the requested data changed relative to the value attribute of the corresponding data entry stored in the local runtime asset data cache of the master node.

If the determination at block 306 is that the value attribute has not changed, at block 308 a determination is made, based on the result of the evaluation, whether the quality attribute of the requested data changed relative to the quality attribute of the corresponding data entry stored in the local runtime asset data cache of the master node. If the determination at block 308 is that the quality attribute has not changed, then at block 314, a time stamp attribute associated with the corresponding data entry stored in the local runtime asset data cache of the master node is updated.

If the determination at block 306 is that the value attribute has changed, then at block 310 the value attribute of the corresponding data entry stored in the local runtime asset data cache of the master node is updated with the value attribute of the requested data. In addition, at block 314, the time stamp attribute associated with the corresponding data entry stored in the local runtime asset data cache is updated.

If the determination at block 308 is that the quality attribute has changed, then at block 312 the quality attribute of the corresponding data entry stored in the local runtime asset data cache of the master node is updated with the quality attribute of the requested data. In addition, at block 314, the time stamp attribute associated with the corresponding data entry stored in the local runtime asset data cache is updated.

At block 316, the updated data entry is replicated by storing it remotely on the workstations of the plant system that are designated as slave nodes.

With reference to FIG. 4, a flow diagram 400 is shown of a method of updating a data entry stored in the local runtime asset data cache (such as runtime data caches 108 shown in FIG. 1) of a master node (such as one of workstations 102 of plant system 100 shown in FIG. 1) with a data entry remotely stored on a slave node of the plant system. The method starts at block 402. At block 404, a data read request is processed in which a runtime asset data service instance (such as data services 106 instances shown in FIG. 1) of a workstation requests to access from its local runtime asset data cache a data entry having asset runtime data. This request can be intended for using the accessed data entry to update the client application hosted by the workstation. This workstation can be designated as a master node that has one or more designated slave nodes included in the plant system, wherein data stored on the local runtime asset data cache is replicated and stored on asset data caches associated with the slave nodes.

At block 406, a determination is made whether there is valid data available in the local runtime asset data cache to be accessed. If the determination at block 406 is that there is valid data available in the local runtime asset data cache, then at block 412, the data entry is accessed and used to update the client application hosted by the workstation.

If the determination at block 406 is that there is not valid data available in the local runtime asset data cache, then at block 408, the workstation connects to the remote runtime asset data cache of one of its slave nodes. At block 410 a corresponding data entry having the asset runtime data is read from the remote runtime asset data cache of the slave node.

Figure 5:
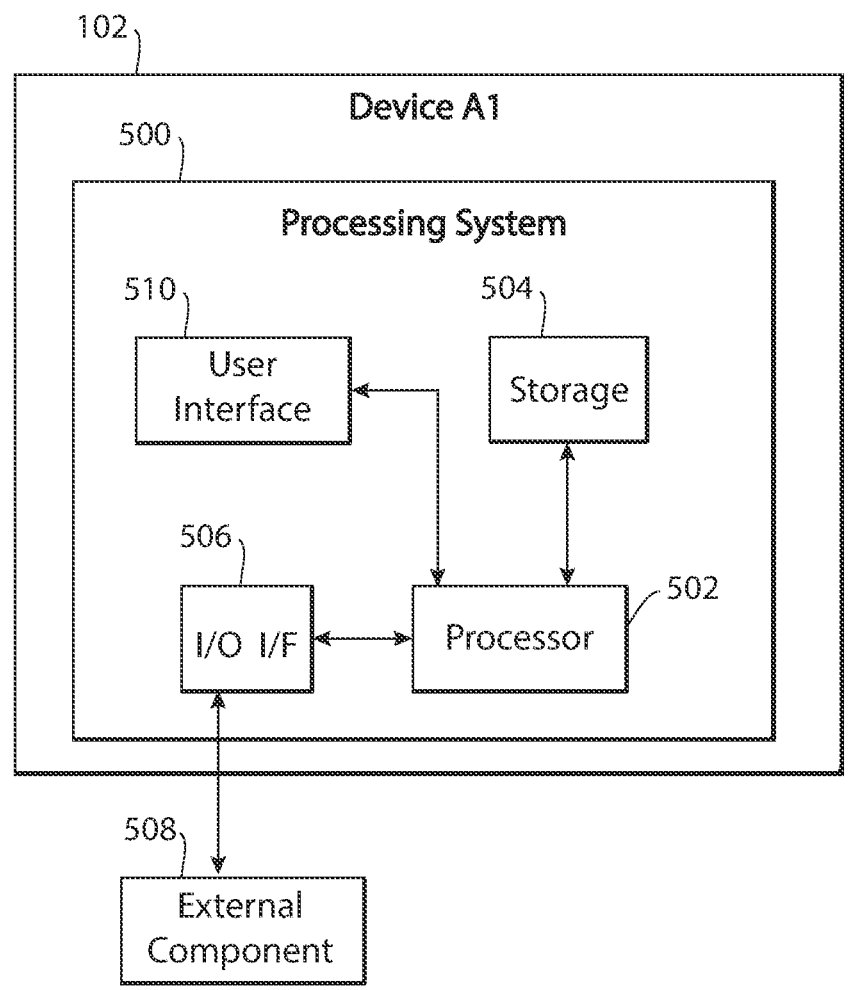
FIG. 5 is a block diagram of an exemplary computer system that implements a cache management system and workstations shown in FIG. 1, in accordance with embodiments of the disclosure.

With reference to FIG. 5, a block diagram of an example computing system 500 is shown, which provides an example configuration of the cache management system 122 and each workstation 102 (including the associated data services 106). Additionally, all or portions of the cache management system 122 and workstations 102 could be configured as software, and computing system 500 could represent such portions. Computing system 500 is only one example of a suitable system and is not intended to suggest any limitation as to the scope of use or functionality of embodiments of the disclosure described herein. Computing system 500 can be implemented using hardware, software, and/or firmware. Regardless, computing system 500 is capable of being implemented and/or performing functionality as set forth in the disclosure.

Computing system 500 is shown in the form of a general-purpose computing device. Computing system 500 includes a processing device 502, memory 504, an input/output (I/O) interface (I/F) 506 that can communicate with an internal component, such as a user interface 510, and optionally an external component 508.

The processing device 502 can include, for example, a PLOD, microprocessor, DSP, a microcontroller, an FPGA, an ASIC, and/or other discrete or integrated logic circuitry having similar processing capabilities.

The processing device 502 and the memory 504 can be included in components provided in the FPGA, ASIC, microcontroller, or microprocessor, for example. Memory 504 can include, for example, volatile and non-volatile memory for storing data temporarily or long term, and for storing programmable instructions executable by the processing device 502. Memory 504 can be a removable (e.g., portable) memory for storage of program instructions. I/O I/F 506 can include an interface and/or conductors to couple to the one or more internal components 510 and/or external components 508.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the cache management system 122 and workstations 102 may be implemented or executed by one or more computer systems, such as a microprocessor. Each computer system 500 can be included within cache management system 122 and workstations 102, or multiple instances thereof. In the example shown, computer system is embedded in cache management system 122 and workstations 102. In various embodiments, computer system 500 may include one or more of a microprocessor, an FPGA, application specific integrated circuit (ASIC), microcontroller. The computer system 500 can be provided as an embedded device. Portions of the computer system 500 can be provided externally, such by way of a centralized computer, a data concentrator, a cockpit computing device controls display of gap status, e.g., notifications about the gap or alerts, or the like.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method for managing availability of runtime asset data used by client applications hosted on each of a plurality of workstations of an industrial system, the method comprising:

determining a distribution of the runtime asset data received at the plurality of workstations from a plurality of data servers, wherein the plurality of workstations are remote from one another, the runtime asset data includes data about assets of the industrial system, and the runtime asset data is determined to be distributed among runtime asset data caches associated with the respective plurality of client applications and stored locally by the workstation that hosts the corresponding client application; and distributing the runtime asset data for storage in the runtime asset data caches based on the determined distribution, wherein at least a portion of the runtime asset data stored locally on the runtime asset data cache associated with the respective plurality of client applications hosted by their corresponding workstations is replicated and stored on the runtime asset data cache associated with at least one other client application of the plurality of client applications that is hosted by its workstation, wherein the runtime asset data stored locally on the runtime asset data cache associated with the respective plurality of client applications hosted by their corresponding workstations is periodically evaluated to determine if the locally stored runtime asset data is up-to-date, and in response to determining the runtime asset data stored locally by a particular runtime asset data cache of the runtime asset data caches is not up-to-date, the locally stored runtime asset data is updated by requesting and retrieving a replicated and updated version of the locally stored runtime asset data from the runtime asset data cache storing the replicated version that is associated with the at least one other client application that is hosted by its workstation, which is remote from the workstation hosting the client application associated with the particular runtime asset data cache.

2. The method of claim 1, further comprising:

periodically evaluating the runtime asset data stored locally on the runtime asset data cache associated with the client application hosted by the workstation to determine if the locally stored runtime asset data is up-to-date;

in response to determining the locally stored runtime asset data is not up-to-date, requesting and retrieving the replicated and updated version of the locally stored runtime asset data from the runtime asset data cache storing the replicated version; and updating the locally stored runtime asset data with the requested data.

3. The method of claim 1, wherein the distribution s based on one or more configurable parameters.

4. The method of claim 1, wherein determining if the locally stored runtime asset data is up-to-date includes evaluating at least one of value, quality, and timestamp attributes of the stored runtime asset data to determine if the stored runtime asset data is up-to-date.

5. The method of claim 1, wherein the locally stored runtime asset data is used by the client application associated with the runtime asset data cache to provide an information view to a user.

6. The method of claim 1, wherein the runtime asset data on the runtime asset data cache provides information about assets of the system, and the information about each asset includes at least one of information about all control loops associated with the asset, relationships between the asset and different assets of the system, and signals associated with the asset.

7. The method of claim 1, further comprising, when runtime asset data stored locally on one of the runtime asset data caches is replicated, identifying a runtime asset data cache that stores the replicated runtime asset data to the client application associated with the runtime asset data cache and/or the client application's hosting workstation.

8. A cache management system for managing availability of runtime asset data used by client applications hosted on each of a plurality of workstations of an industrial system, the cache management comprising:

a memory configured to store a plurality of programmable instructions; and at least one processing device in communication with the memory, wherein the at least one processing device, upon execution of the plurality of programmable instructions is configured to:

determine a distribution of the runtime asset data received at the plurality of workstations from a plurality of data servers, wherein the plurality of workstations being remote from one another, the runtime asset data includes data about assets of the industrial system, and the runtime asset data is determined to be distributed among runtime asset data caches associated with the respective plurality of client applications and stored locally by the workstation that hosts the corresponding client application; and distribute the runtime asset data for storage in the runtime asset data caches based on the determined distribution, wherein at least a portion of the runtime asset data stored locally on the runtime asset data cache associated with the respective plurality of client applications hosted by their corresponding workstations is replicated and stored on the runtime asset data cache associated with at least one other client application of the plurality of client applications that is hosted by its workstation, wherein the runtime asset data stored locally on the runtime asset data cache associated with the respective plurality of client applications hosted by their corresponding workstations is periodically evaluated to determine if the locally stored runtime asset data is up-to-date, and in response to determining the runtime asset data stored locally by a particular runtime asset data cache of the runtime asset data caches is not up-to-date, the locally stored runtime asset data is updated by requesting and retrieving a replicated and updated version of the locally stored runtime asset data from the runtime asset data cache storing the replicated version that is associated with the at least one other client application that is hosted by its workstation, which is remote from the workstation hosting the client application associated with the particular runtime asset data cache.

9. The cache management system of claim 8, wherein the data servers include hardware devices and/or software data sources that transmit the runtime asset data to respective data service providers implemented on the respective plurality of workstations.

10. The cache management system of claim 8, further comprising a data service instance associated with each workstation, the data service instance associated with each workstation comprising:

a data service memory configured to store a plurality of data service programmable instructions; and at least one data service processing device in communication with the data service memory, wherein the at least one data service processing device, upon execution of the plurality of data service programmable instructions is configured to:

periodically evaluate the runtime asset data stored locally on the runtime asset data cache associated with the client application hosted by the workstation to determine if the locally stored runtime asset data is up-to-date;

in response to determining the locally stored runtime asset data is not up-to-date, request and retrieve a replicated and updated version of the locally stored runtime asset data from the runtime asset data cache storing the replicated version; and update the locally stored runtime asset data with the requested data.

11. The cache management system of claim 8, wherein at least one of the workstations is a cloud-hosted control interface workstation providing an interface between a user and a machine or operations system for controlling and/or managing the machine or operations system, and at least one of the plurality of work stations is at least one of an on-site control interface workstation, an embedded control interface workstation, a virtualized control interface workstation, a containerized control interface workstation, or a control interface workstation hosted directly on hardware.

12. The cache management system of claim 8, wherein the distribution is based on one or more configurable parameters.

13. The cache management system of claim 8, wherein determining if the locally stored runtime asset data is up-to-date includes evaluating at least one of value, quality, and timestamp attributes of the stored runtime asset data to determine if the stored runtime asset data is up-to-date.

14. The cache management system of claim 8, wherein the locally stored runtime asset data is used by the client application associated with the runtime asset data cache to provide an information view to a user.

15. The cache management system of claim 8, wherein the runtime asset data on the runtime asset data cache provides information about assets of the system, and the information about each asset includes at least one of information about all control loops associated with the asset, relationships between the assets and different assets of the system, and signals associated with the asset.

16. The cache management system of claim 8, wherein the at least one data service processing device, upon execution of the plurality of data service programmable instructions is further configured to, when runtime asset data stored locally on one of the runtime asset data caches is replicated, identify a runtime asset data cache that stores the replicated runtime asset data to the client application associated with the runtime asset data cache and/or the client application's hosting workstation.

17. A method for managing availability of runtime asset data used by client applications hosted on each of a plurality of workstations of an industrial system, the method comprising:

at a workstation of the plurality of workstations, accessing a portion of the runtime asset data stored locally by a runtime asset data cache associated with a client application of the plurality of applications that is hosted by the workstation, wherein the plurality of workstations being remote from one another, the runtime asset data includes data about assets of the industrial system, the runtime asset data is distributed to be stored among runtime asset data caches associated with the respective plurality of client applications and stored locally be the workstation that hosts the corresponding client application, and at least a portion of the runtime asset data stored locally on the runtime asset data cache associated with the respective plurality of client applications hosted by their corresponding workstations is replicated and stored on the runtime asset data cache associated with at least one other client application of the plurality of client applications that is hosted by its workstation;

periodically evaluating the runtime asset data stored locally on the runtime asset data cache associated with the respective plurality of client applications hosted by their corresponding workstations to determine if the locally stored runtime asset data is up-to-date; and in response to determining the runtime asset data stored locally by a particular runtime asset data cache of the runtime asset data caches is not up-to-date, updating the locally stored runtime asset data by requesting and retrieving a replicated and updated version of the locally stored runtime asset data from the runtime asset data cache storing the replicated version that is associated with the at least one other client application that is hosted by its workstation, which is remote from the workstation hosting the client application associated with the particular runtime asset data cache.

18. The method of claim 17, further comprising receiving the portion of the runtime asset data at communication interfaces of the workstation and storing the portion of the runtime asset data in the runtime asset data cache-associated with the client application hosted by the workstation.

19. The method of claim 18, wherein the communication interfaces of the workstation are extensible communication interfaces.

20. The method of claim 17, further comprising at the workstation, translating the portion of the runtime asset data stored locally by the runtime asset data cache into a workable protocol that can be processed by the workstation and/or used by the client application hosted by the workstation.

* * * * *